J. M. ALI.
LOCKING DEVICE FOR MOTOR VEHICLES.
APPLICATION FILED APR. 14, 1917.

1,250,122.

Patented Dec. 18, 1917.

Inventor
J. Mohammad Ali

By Whittemore Hulbert & Whittemore
Attorneys

UNITED STATES PATENT OFFICE.

J. MOHAMMAD ALI, OF DETROIT, MICHIGAN.

LOCKING DEVICE FOR MOTOR-VEHICLES.

1,250,122.  Specification of Letters Patent.  Patented Dec. 18, 1917.

Application filed April 14, 1917. Serial No. 161,974.

*To all whom it may concern:*

Be it known that I, J. MOHAMMAD ALI, a subject of the King of Great Britain and Ireland, residing at Detroit, in the county of Wayne and State of Michigan, have invented certain new and useful Improvements in Locking Devices for Motor-Vehicles, of which the following is a specification, reference being had therein to the accompanying drawings.

The invention relates to locking devices for motor vehicles of that type in which the gear-shift or control-lever is locked in neutral position. It is the object of the present invention to provide a simple construction of locking link which is readily engageable with permanent and standard parts of the vehicle and with the control-lever, the arrangement being such that when locked to the control-lever the link is held from displacement from its anchorage and to prevent movement of said lever.

Figure 1:
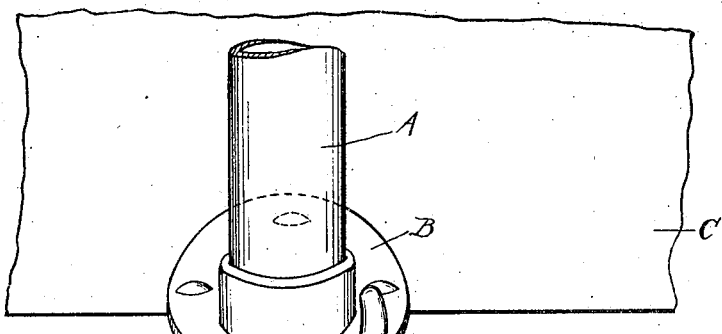
Figure 1 is an elevation of the locking means as viewed from rear toward the front of the vehicle.
Figure 2:
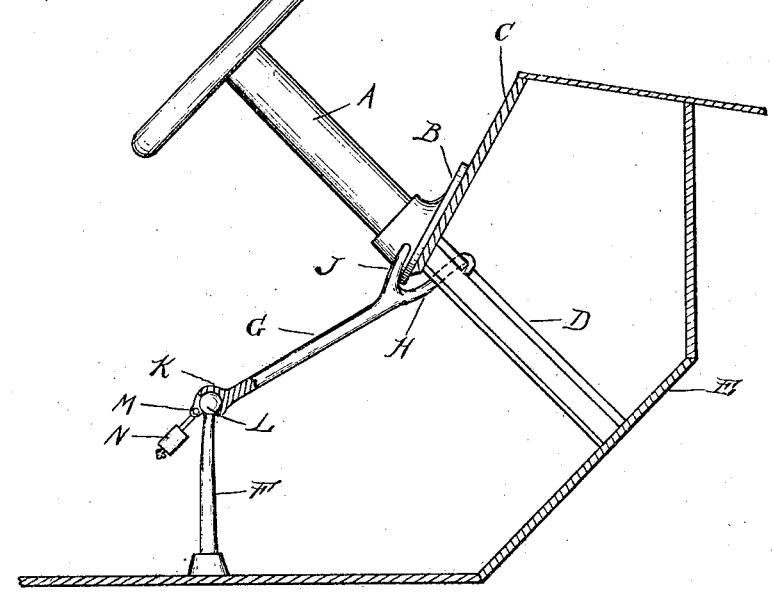
Fig. 2 is a side elevation thereof.

My improved construction is particularly adapted for use in connection with motor vehicles of that type in which the tubular housing of the steering stem is mounted in a bracket upon the cowl of the vehicle and is provided with rods which extend downward through the foot-board to the mechanism therebeneath. As shown, A is the tubular housing of the steering stem, B the bracket mounted upon a panel or front-board C of the cowl and D are the rods passing through said front-board and downward through the foot-board E. F is the control-lever, which is located in rear and at one side of the steering-stem A and is adjustable to shift the gears.

My improved locking device comprises a link G formed of any suitable material and provided at one end with a bifurcated portion H. One of the furcations is adapted to pass beneath the front-board C and is provided with a returnbent hook I which may be engaged with the rod D in one position of angular adjustment of said link. The other furcation J is so fashioned that in one position of the link, after engagement of the hook I with the rod D, said furcation J may be passed above the front-board C and bracket B. The construction is also such that by turning the link G from the position of engagement to a position where its opposite end registers with the end of the control lever F, the furcation J will extend inward from the edge of the front-board C, being above the bracket B, while the said furcation H is below the same. In this position the bifurcated end of the link can be moved neither forward, back nor sidewise, and consequently if it is attached by a locking engagement with the control-lever F the latter will be held from adjustment. Such an attachment is provided for by forming a socket portion K at the rear end of the link for engaging the pawl-head L of the lever, and ears M projecting from said socket are apertured for engagement with a padlock N, which when so engaged will prevent disengagement of the pawl L from the socket K.

One of the advantages of my construction is that it does not require the permanent mounting of any additional member on the vehicle but is engageable with standard and permanent parts of said vehicle. Thus, it may be applied by anyone desiring to lock the machine, and when applied cannot be removed without injury to a vital part of the mechanism. The construction is also one which may be readily manufactured by well-known processes, such as drop-forging, stamping, or casting.

What I claim as my invention is:

The combination with the steering-stem of an automobile, of a bracket in which said stem is mounted having an enlargement at one point thereof, of a link bifurcated at one end with a returnbent hook on one of the furcations, said hook being engageable with said stem on one side of said enlargement and the other furcation being engageable with the bracket on the opposite side of said enlargement when said link is in a predetermined position of angular adjustment and being locked from disengagement or movement upon said stem when in another position of angular adjustment, the opposite end of said link being registrable with the control-lever when in neutral position and when the bifurcated end is in locked position, and means for locking the link to said control-lever when in registration therewith.

In testimony whereof I affix my signature.

J. MOHAMMAD ALI.